United States Patent [19]
Lin

[11] Patent Number: 5,894,355
[45] Date of Patent: Apr. 13, 1999

[54] OPTICAL SCANNER WITH SLIDING BOX TYPE DOCUMENT CARRIER

[76] Inventor: Bob Lin, No. 9, Lane 102, San-Min Rd., Taipei, Taiwan

[21] Appl. No.: 08/923,081

[22] Filed: Sep. 4, 1997

[51] Int. Cl.⁶ .................................................. H04N 1/04
[52] U.S. Cl. ........................ 358/496; 358/474; 358/498; 355/75
[58] Field of Search ............................ 358/496, 498, 358/471, 474; 399/367, 369, 377, 378, 379, 380, 213; 355/75

[56] References Cited

U.S. PATENT DOCUMENTS

| | | | |
|---|---|---|---|
| 5,270,841 | 12/1993 | Watanabe | 358/496 |
| 5,655,452 | 8/1997 | Blake et al. | 271/900 |
| 5,663,812 | 9/1997 | Pan | 358/474 |
| 5,677,777 | 10/1997 | Tsai | 358/498 |
| 5,742,407 | 4/1998 | Albrecht et al. | 358/496 |
| 5,808,757 | 9/1998 | Ikeda | 358/498 |

*Primary Examiner*—Alan A. Mathews
*Attorney, Agent, or Firm*—Bacon & Thomas, PLLC

[57] ABSTRACT

An optical scanner includes a scanning mechanism controlled to pick up an image from a document passing through a scanning area, a document carrier adapted to carry the document and to move it through the scanning area along a horizontal path spaced from the scanning mechanism at a focal distance for scanning, the document carrier having a document supporting surface covered with an anti-skid pad for holding document, a driving mechanism controlled to reciprocate said document carrier along said horizontal path through the scanning area.

5 Claims, 5 Drawing Sheets

OPTICAL SCANNER WITH SLIDING BOX TYPE DOCUMENT CARRIER

BACKGROUND OF THE INVENTION

The present invention relates to optical scanners for picking up image of document and converting it into electrical signal, and more particularly to such an optical scanner which uses a sliding box type document carrier to carry document through the scanning area for scanning.

Using a photoelectric element to pick up an image of a document is a well known technique. Regular optical scanners commonly use a photoelectric element to pick up the image of the document, and rollers to carry the document through the scanning area. Carrying the document through scanning area by rollers may cause document to be damaged. If a transparent board is used to hold down the document when the document is moved through the scanning area, light rays from the light source of the scanning mechanism may be distorted. Further, these optical scanners are not practical for scanning documents having an uneven surface.

SUMMARY OF THE INVENTION

It is one object of the present invention to provide an optical scanner which is practical for scanning a variety of documents without causing a damage to documents. It is another object of the present invention to provide an optical scanner which stops a document from sliding when the document is carried through the scanning area. It is still another object of the present invention to provide an optical scanner which is practical for scanning documents having an uneven surface. It is still another object of the present invention to provide an optical scanner which has a simple structure. According to one aspect of the present invention, the optical scanner is comprised of a scanning mechanism controlled to pick up an image from a document passing through a scanning area, a the document carrier adapted to carry the document and to move it through the scanning area along a horizontal path spaced from the scanning mechanism at a focal distance for scanning, the document carrier having a flat, recessed document supporting surface for carrying the document, and a driving mechanism controlled to reciprocate said document carrier along said horizontal path through the scanning area. According to another aspect of the present invention, the document supporting surface of the document carrier is covered with an anti-skid pad for holding the document in place.

DETAILED DESCRIPTION OF THE PREFERRED EMBODIMENT

Figure 1:
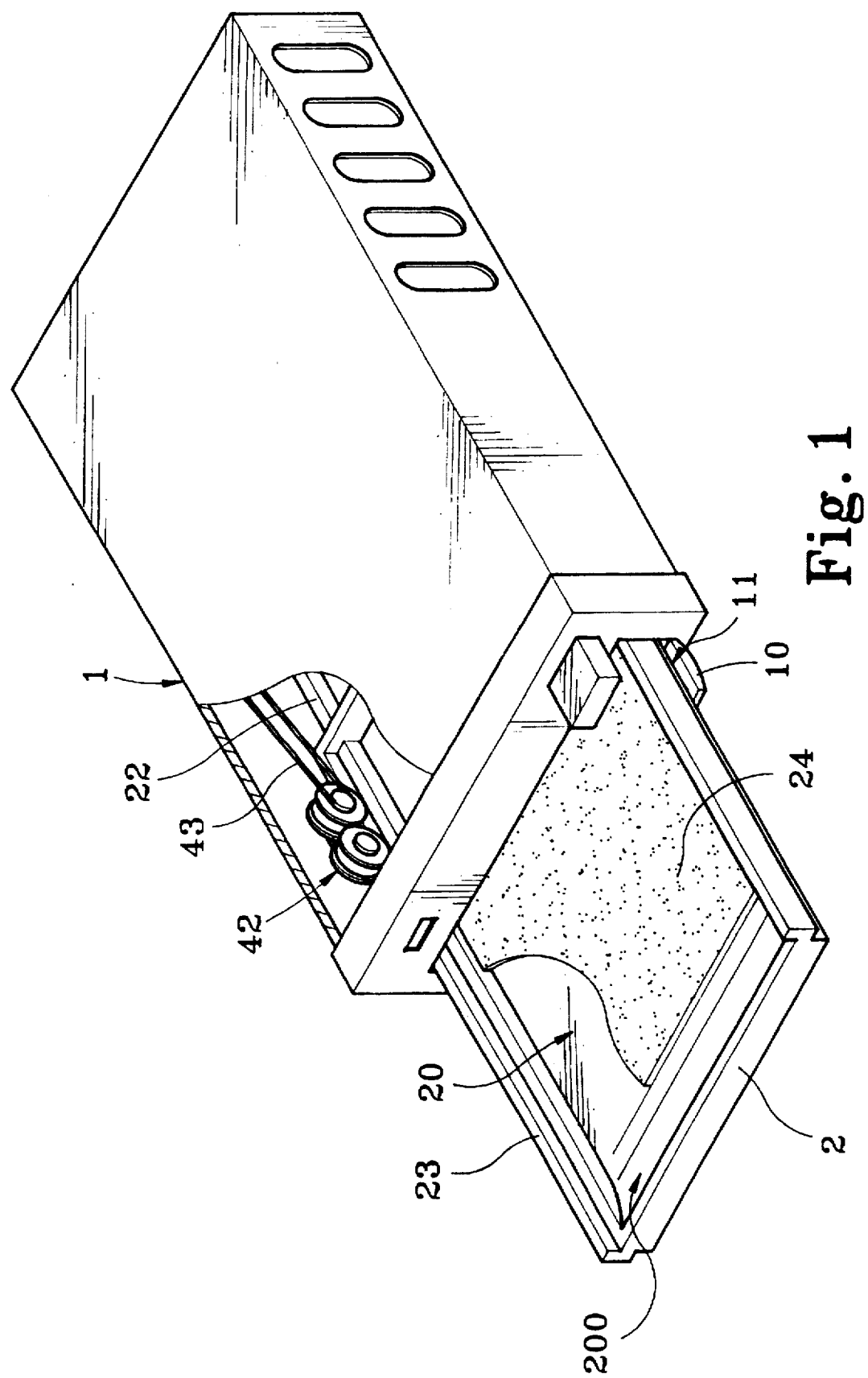
FIG. 1 is a cutaway view of an optical scanner according to the present invention.

Referring to FIG. 1, an optical scanner in accordance with the present invention is generally comprised of a housing 1 which comprises a feed hole 11 at its front side and a cover 10 adapted to close the feed hole 11, a document carrier 2 moved in and out of the feed hole 11 of the housing 1, a scanning mechanism mounted inside the housing 1 and controlled to pick up an image of a document carried on the document carrier 2, and a driving mechanism controlled to reciprocate the document carrier 2.

Figure 2:
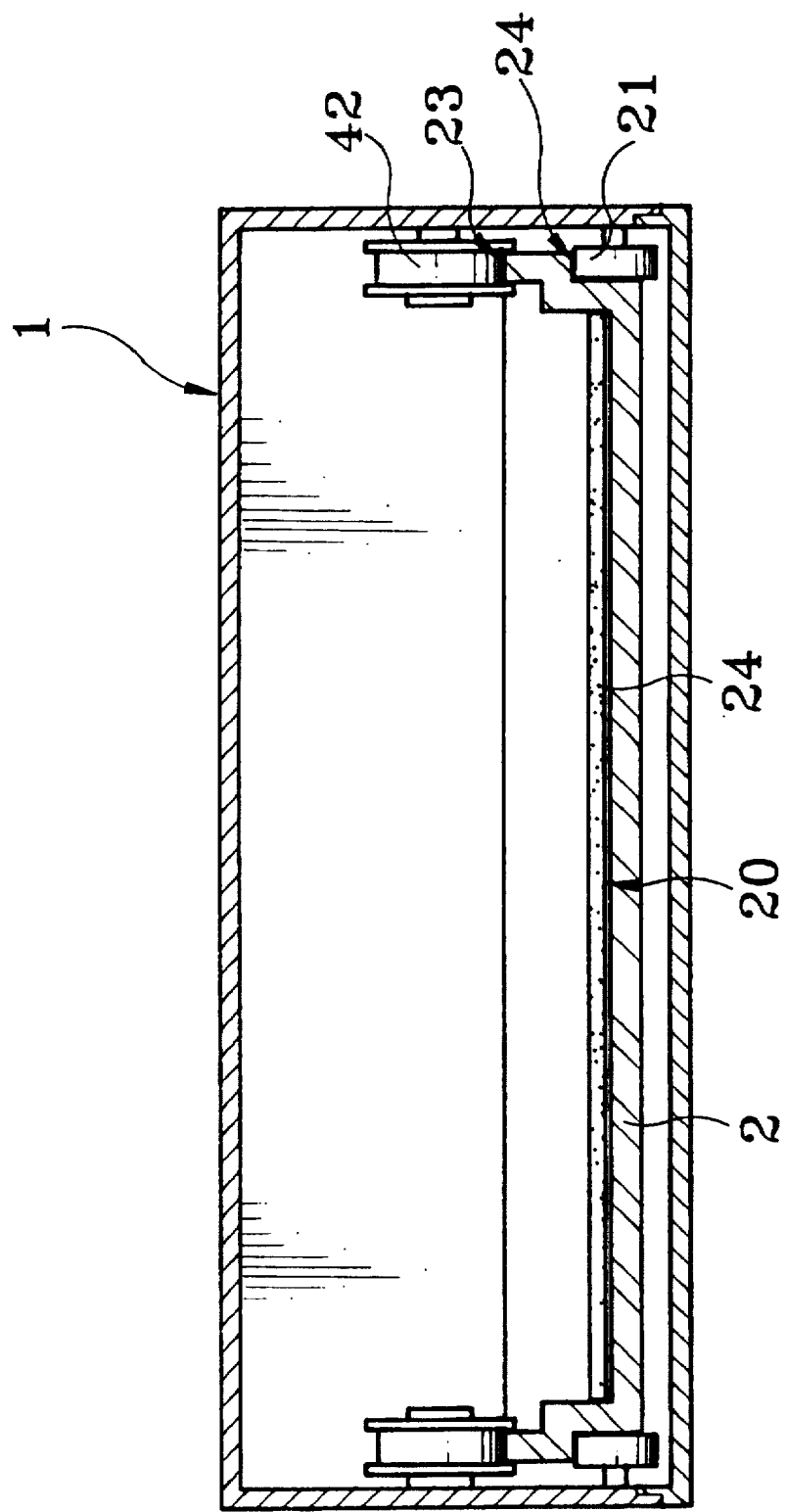
FIG. 2 is a cross sectional view of the optical scanner shown in FIG. 1.
Figure 3:
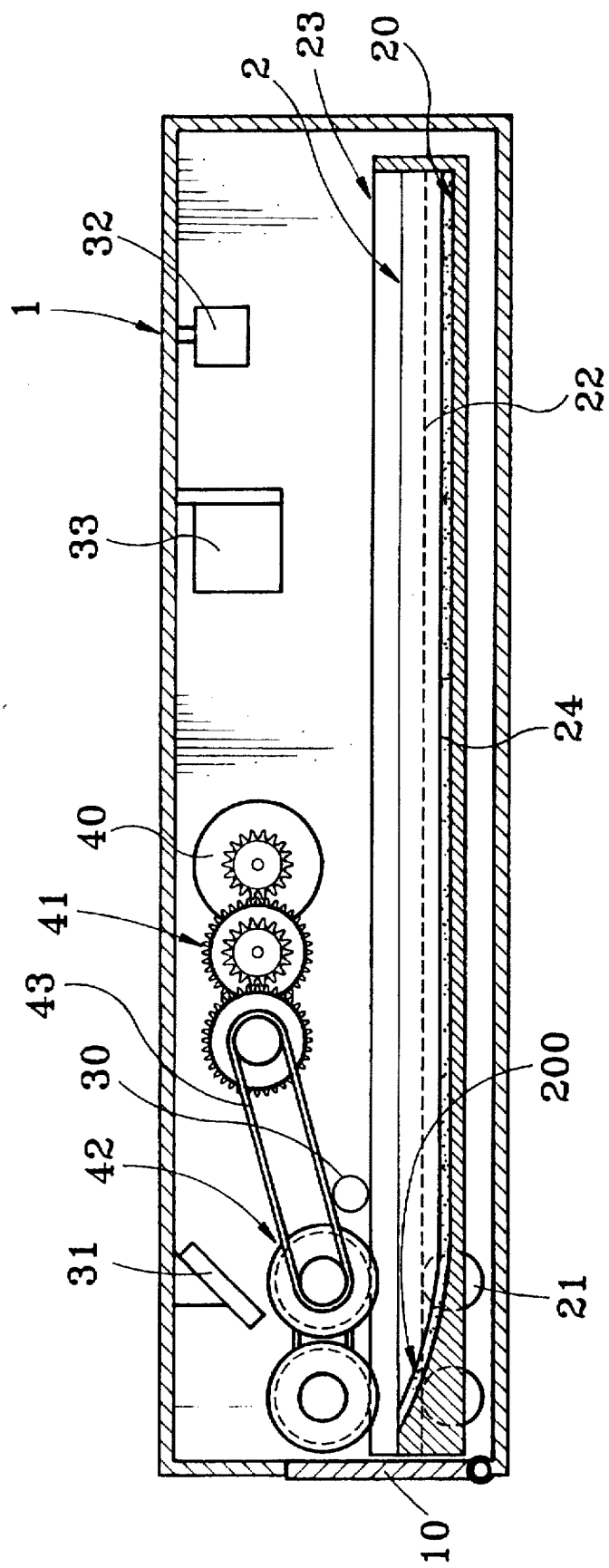
FIG. 3 is a longitudinal view in section of the optical scanner shown in FIG. 1, showing the document carrier received inside the housing.
Figure 4:
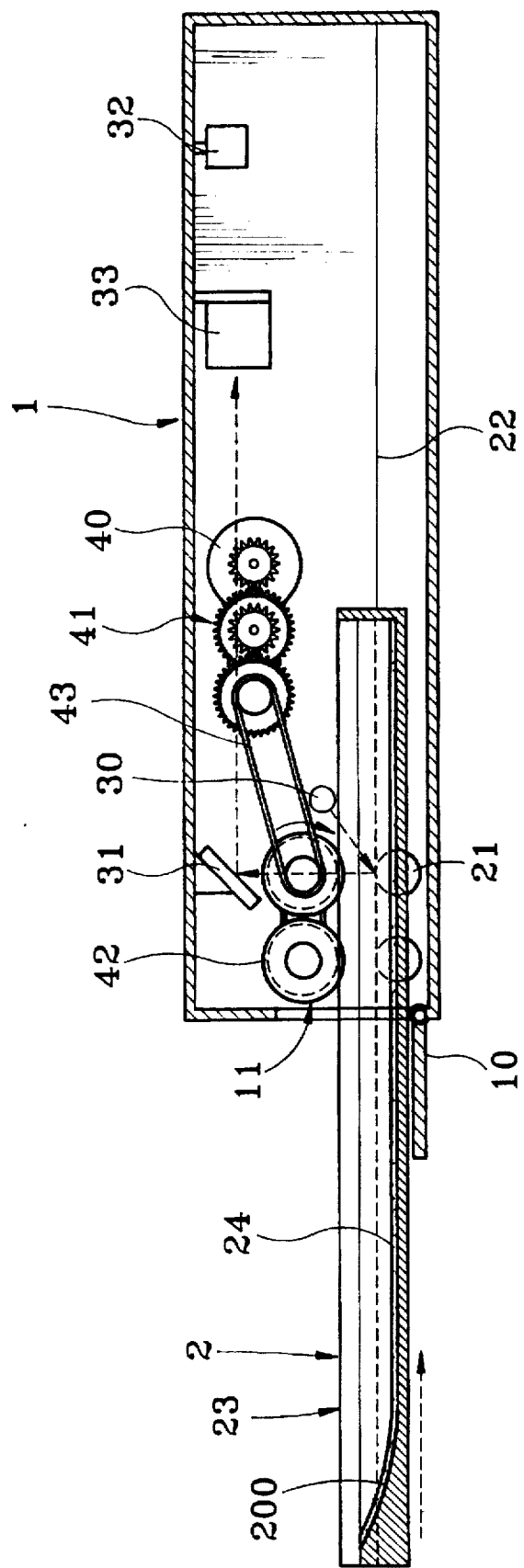
FIG. 4 is similar to FIG. 3 but showing the document carrier moved out of the feed slot of the housing.

Referring to FIGS. 2 and 3 and FIG. 1 again, the cover 10 is pivoted to the housing 1 and supported on spring means. When the document carrier 2 is moved into the inside of the housing 1, the cover 10 is forced by the spring means to close the feed hole 11. When the document carrier 2 is moved out of the housing 1, the cover 10 is forced to open the feed hole 11 for permitting the document carrier 2 to pass.

The aforesaid scanning mechanism comprises a light source 30 fixedly mounted inside the housing 1 near the feed hole 11, and controlled to provide scanning light to a particular area through which the document carrier 2 passes, a photoelectric element for example a CCD (charge coupled device) 32 adapted to pick up an image of the document and to convert it into an electrical signal, a lens 33 adapted to focus light onto the CCD 32, and a reflector 31 adapted to reflect light from document on the document carrier 2 onto the focus lens 33 and the CCD 32.

The aforesaid driving mechanism comprises a reversible motor 40, a reduction gear 41 coupled to the reversible motor 40 and turned by it, two friction wheels 42 driven to reciprocate the document carrier 2, and a transmission mechanism 43 coupled between the reduction gear 41 and the friction wheels 42. The transmission mechanism 43 can be a belt transmission mechanism or gear transmission mechanism.

Figure 5:
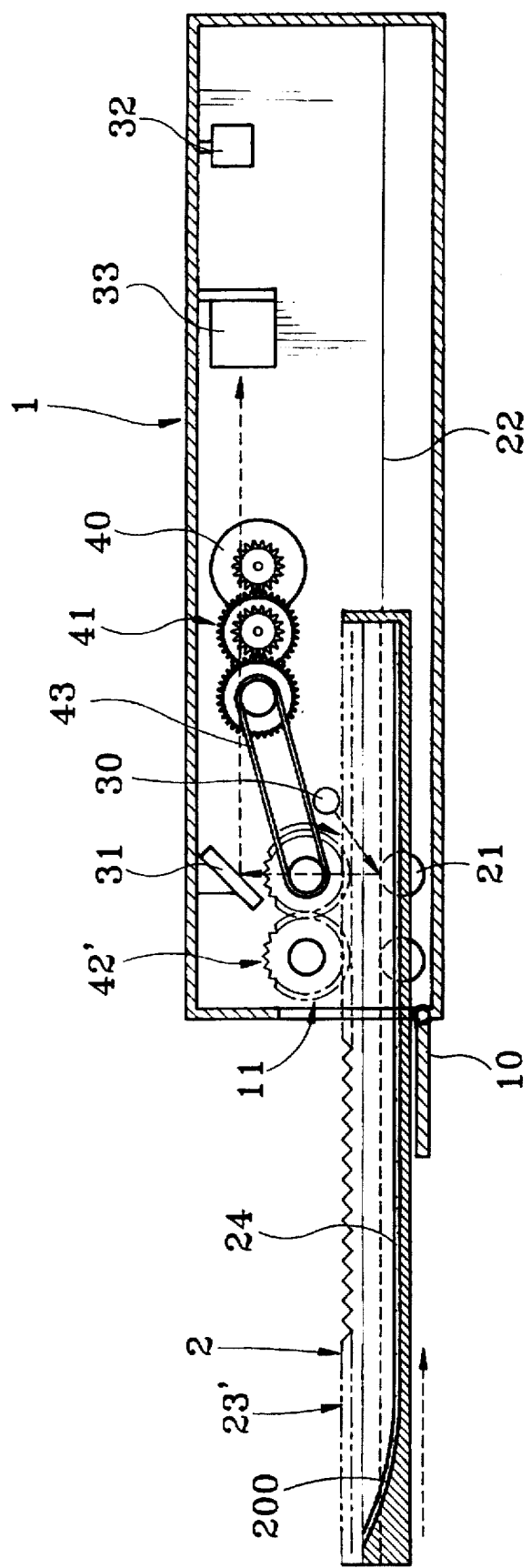
FIG. 5 is a sectional view of an alternate form of the optical scanner according to the present invention.

The document carrier 2 is a flat member having a flat supporting surface 20 at its top side adapted for carrying document. The flat supporting surface 20 can be a recessed flat surface of a raised platform. The document carrier 2 shown in FIGS. from 1 to 3 comprises a recessed flat supporting surface 20 at its top side adapted for carrying document, a sloping guide surface 200 at its front side adapted for guiding document to the recessed flat supporting surface 200, an anti-skid pad 24 covered on the recessed flat supporting surface 200 to prevent document from sliding, and two friction surfaces 23 longitudinally and bilaterally disposed at one side and disposed in contact with the friction wheels 42. Through the sloping guide surface 200, the document can be conveniently pulled out of the document carrier 2 by hand. The anti-skid pad 24 can be a rubber pad, or a sheet member having a coarse top side. Further, a track 22 and supporting wheels 21 are mounted inside the housing 1 to support the document carrier 2, for permitting the document carrier 2 to be stably moved along a fixed horizontal path, which is spaced from the scanning mechanism at a focal distance. Gears 42' and racks 23' may be used instead of the friction wheels 42 and the friction surfaces 23 for driving the document carrier 2 (see FIG. 5). A transparent glass cover sheet may be provided to hold down the document on the document carrier 2. Further, a white color reference strip (not shown) is provided at one end of the document carrier 20 for color calibration.

When the optical scanner does no work, the document carrier 2 is received inside the housing 1, and the cover 10 is closed on the feed hole 11. When the optical scanner is started, the document carrier 2 is extended out of the feed hole 11, and the user can then put the document (picture or drawing) on the document carrier 2. When the scanning function of the optical scanner is started, the document carrier 2 is driven by the friction wheels 42 and moved to the inside of the housing 1, and the document is moved through the scanning area within the lighting range of the light source 30. After scanning, the document carrier 2 is moved to the stand-by position shown in FIG. 3. Alternatively, the optical scanner can be designed to start prescan when the document carrier 2 is moved toward the inside of the housing 1, and then to start normal scan when the document carrier 2 is moved toward the outside of the housing 1.

Because the flat supporting surface 20 is a recessed surface and the photoelectric element 32 is not a contact image sensor, there is a certain depth of field, and the scanning operation can still be achieved even with a minor difference the optical path. Therefore, the optical scanner can scan flat documents (paper, drawing, picture, etc.), as well as tags, watches and other small articles of small thickness.

What I claimed is:

1. An optical scanner comprising:
    a scanning mechanism controlled to pick up an image from a document passing through a scanning area;
    a document carrier adapted to carry a document and to move the document through said scanning area along a horizontal path spaced from said scanning mechanism at a focal distance for scanning, said document carrier having a document supporting surface covered with an anti-skid pad for holding said document; and
    a driving mechanism controlled to reciprocate said document carrier along said horizontal path through said scanning area,
    wherein said document carrier is a flat member having a sloping guide surface for guiding said document to said anti-skid pad, said document supporting surface being a recessed flat surface, said anti-skid pad having a top side spaced below the topmost edge of said document carrier.

2. The optical scanner of claim 1, wherein said scanning mechanism comprises a fixed light source controlled to provide scanning light to said scanner area, a photoelectric element adapted to pick up image of said document passing through said scanning area and to convert it into an electrical signal, a lens adapted to focus light onto said photoelectric element, and a reflector adapted to reflect light from said document passing through said scanning area onto said focus lens and said photoelectric element.

3. The optical scanner of claim 1 further comprising supporting wheels and track means adapted to support said document carrier, for permitting said document carrier to be moved along said horizontal path.

4. An optical scanner comprising:
    a scanning mechanism controlled to pick up an image from a document passing through a scanning area;
    a document carrier adapted to carry a document and to move the document through said scanning area along a horizontal path spaced from said scanning mechanism at a focal distance for scanning, said document carrier having a document supporting surface covered with an anti-skid pad for holding said document; and
    a driving mechanism controlled to reciprocate said document carrier along said horizontal path through said scanning area,
    wherein said document carrier comprises two friction surfaces bilaterally disposed at a top of said document carrier; and said driving mechanism comprises a reversible motor, a reduction gear coupled to said reversible motor and turned by said reversible motor, two friction wheels disposed in contact with said friction surfaces of said document carrier and driven to reciprocate said document carrier along said horizontal path, and a transmission mechanism coupled between said reduction gear and said friction wheels.

5. An optical scanner comprising:
    a scanning mechanism controlled to pick up an image from a document passing through a scanning area;
    a document carrier adapted to carry a document and to move the document through said scanning area along a horizontal path spaced from said scanning mechanism at a focal distance for scanning, said document carrier having a document supporting surface covered with an anti-skid pad for holding said document; and
    a driving mechanism controlled to reciprocate said document carrier along said horizontal path through said scanning area,
    wherein said document carrier comprises two racks bilaterally disposed at a top of said document carrier; and said driving mechanism comprises a reversible motor, a reduction gear coupled to said reversible motor and turned by said reversible motor, two driving gears disposed in contact with said racks of said document carrier and driven to reciprocate said document carrier along said horizontal path, and a transmission mechanism coupled between said reduction gear and said driving gears.

* * * * *